United States Patent
Nielson et al.

(10) Patent No.: US 10,571,614 B2
(45) Date of Patent: Feb. 25, 2020

(54) WIRE GRID POLARIZER HEAT SINK HAVING SPECIFIED REFLECTIVE LAYER, ABSORPTIVE LAYER, AND HEAT-DISSIPATION LAYER

(71) Applicant: Moxtek, Inc., Orem, UT (US)

(72) Inventors: R. Stewart Nielson, Pleasant Grove, UT (US); Shaun Ogden, Saratoga Springs, UT (US); Mathew Free, Orem, UT (US); Bradley R. Williams, Pocatello, ID (US); Fred Lane, Lindon, UT (US); Ted Wangensteen, Pleasant Grove, UT (US); Matthew C. George, Murray, UT (US)

(73) Assignee: Moxek, Inc., Orem, UT (US)

( * ) Notice: Subject to any disclaimer, the term of this patent is extended or adjusted under 35 U.S.C. 154(b) by 146 days.

(21) Appl. No.: 15/709,127

(22) Filed: Sep. 19, 2017

(65) Prior Publication Data

US 2018/0052270 A1 Feb. 22, 2018

Related U.S. Application Data

(63) Continuation-in-part of application No. 15/691,315, filed on Aug. 30, 2017, now Pat. No. 10,444,410, and
(Continued)

(51) Int. Cl.
  *G02B 5/30* (2006.01)
  *G02B 7/00* (2006.01)
  *G02F 1/1335* (2006.01)

(52) U.S. Cl.
  CPC ........... *G02B 5/3058* (2013.01); *G02B 7/008* (2013.01); *G02B 5/3025* (2013.01); *G02B 5/3033* (2013.01); *G02F 2001/133548* (2013.01)

(58) Field of Classification Search
  CPC ............... G02B 5/3025; G02B 5/3058; G02B 27/28–288; G02F 1/133536;
(Continued)

(56) References Cited

U.S. PATENT DOCUMENTS 7,961,393 B2  6/2011  Perkins et al.
8,576,672 B1  11/2013  Peng et al.
(Continued)

FOREIGN PATENT DOCUMENTS

WO    WO 2009104861 A1    8/2009

OTHER PUBLICATIONS

"Aluminum Oxide, Al2O3 Ceramic Properties", retrieved from http://accuratus.com/alumox.html on May 31, 2019 (Year: 2013).*
(Continued)

*Primary Examiner* — Ryan S Dunning
(74) *Attorney, Agent, or Firm* — Thorpe, North & Western, LLP

(57) ABSTRACT

A wire grid polarizer (WGP) can include a heat-dissipation layer. The heat-dissipation layer can enable the WGP to be able to endure high temperatures. The heat-dissipation layer can be located (a) over an array of wires and farther from a transparent substrate than the array of wires; or (b) between the array of wires and the transparent substrate. The heat-dissipation layer can be a continuous layer. The heat-dissipation layer can have a high electrical resistivity and a high coefficient of thermal conductivity.

17 Claims, 7 Drawing Sheets

Figure 1:
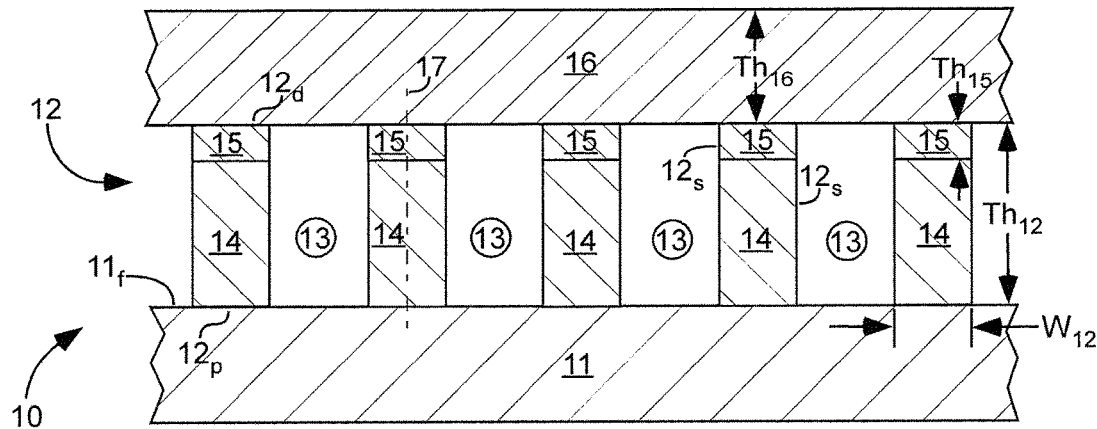

Related U.S. Application Data a continuation-in-part of application No. 15/631,256, filed on Jun. 23, 2017.

(60) Provisional application No. 62/425,339, filed on Nov. 22, 2016, provisional application No. 62/375,675, filed on Aug. 16, 2016.

(58) Field of Classification Search
CPC .... G02F 2001/133548; G02F 1/13362; H04N 9/3167
USPC ............... 216/24; 349/8, 9, 96; 359/485.05, 359/487.03, 487.05; 385/11, 132; 427/163.1; 428/1.31
See application file for complete search history.

(56) References Cited

U.S. PATENT DOCUMENTS

| | | |
|---|---|---|
| 8,755,113 B2 | 6/2014 | Gardner et al. |
| 2003/0102286 A1 | 6/2003 | Takahara et al. |
| 2003/0227678 A1 | 12/2003 | Lines et al. |
| 2004/0218270 A1 | 11/2004 | Wang |
| 2006/0087602 A1 | 4/2006 | Kunisada et al. |
| 2008/0152892 A1 | 6/2008 | Edlinger et al. |
| 2008/0316599 A1 | 12/2008 | Wang et al. |
| 2009/0066885 A1* | 3/2009 | Kumai ................ G02B 5/3058 349/96 |
| 2009/0109377 A1 | 4/2009 | Sawaki et al. |
| 2009/0153961 A1 | 6/2009 | Murakami et al. |
| 2010/0225832 A1 | 9/2010 | Kumai |
| 2010/0225886 A1* | 9/2010 | Kumai ................ G02B 5/3041 353/20 |
| 2012/0008205 A1 | 1/2012 | Perkins et al. |
| 2012/0075699 A1 | 3/2012 | Davis et al. |
| 2012/0319222 A1 | 12/2012 | Ozawa et al. |
| 2013/0250411 A1 | 9/2013 | Bangerter et al. |
| 2015/0062500 A1 | 3/2015 | Park et al. |
| 2016/0062017 A1 | 3/2016 | Nielson et al. |
| 2018/0052270 A1 | 2/2018 | Nielson et al. |
| 2018/0143364 A1 | 5/2018 | Wang et al. |
| 2018/0259698 A1 | 9/2018 | Nielson et al. |
| 2018/0267221 A1 | 9/2018 | Oowada et al. |
| 2019/0041564 A1* | 2/2019 | Nielson ................ G02B 5/3058 |

OTHER PUBLICATIONS

"2.1 Silicon Dioxide Properties", retrieved from http://www.iue.tuwien.ac.at/phd/filipovic/node26.html on May 31, 2019 (Year: 2019).*

International search report dated Dec. 20, 2017, in International Application No. PCT/US2017/052471, filed Sep. 20, 2017; 4 pages.

International Search Report dated Jul. 3, 2019, in International Application No. PCT/US2018/054361, filed Oct. 4, 2018; 4 pages.

* cited by examiner

US 10,571,614 B2

WIRE GRID POLARIZER HEAT SINK HAVING SPECIFIED REFLECTIVE LAYER, ABSORPTIVE LAYER, AND HEAT-DISSIPATION LAYER

CLAIM OF PRIORITY

This application is a continuation-in-part of U.S. patent application Ser. No. 15/691,315, filed on Aug. 30, 2017, which claims priority to U.S. Provisional Patent Application No. 62/425,339, filed on Nov. 22, 2016, and is a continuation-in-part of U.S. patent application Ser. No. 15/631,256, filed on Jun. 23, 2017, which claims priority to U.S. Provisional Patent Application No. 62/375,675, filed on Aug. 16, 2016, all of which are incorporated herein by reference.

FIELD OF THE INVENTION

The present application is related generally to wire gird polarizers.

BACKGROUND

A wire grid polarizer (WGP) can be used in an application with high temperatures, such as for example computer projectors. As computer projectors decrease in size and increase in brightness, due to customer demand, the need for WGPs that can endure a high temperature environment also increases.

Selectively-absorptive WGPs are particularly susceptible to damage in high-light-intensity computer projectors because they absorb a large percent of incident light. Such WGPs typically have wires that include a reflective portion (e.g. aluminum) and an absorptive portion (e.g. silicon). The absorptive portion can absorb about 80% of one polarization of light, and thus about 40% of the total amount of light. Much of the heat from this absorbed light conducts to the reflective portion of the wire, which can melt, thus destroying the WGP.

SUMMARY

It has been recognized that it would be advantageous to provide a wire grid polarizer (WGP) that can endure high temperatures. The present invention is directed to various embodiments of WGPs that satisfy this need.

The WGP can comprise an array of wires over a face of a transparent substrate, with channels between adjacent wires. Each of the wires can include a reflective layer and an absorptive layer. The WGP can further comprise a heat-dissipation layer, which can be located over the array of wires between the array of wires and the transparent substrate. The heat-dissipation layer can be a continuous layer. The heat-dissipation layer can have a high electrical resistivity and a high coefficient of thermal conductivity.

BRIEF DESCRIPTION OF THE DRAWINGS (DRAWINGS MIGHT NOT BE DRAWN TO SCALE)

FIG. 1 is a schematic, cross-sectional side-view of a wire grid polarizer (WGP) 10 comprising an array of wires 12 over a face 11$_f$ of a transparent substrate 11, with channels 13 between adjacent wires 12, each of the wires 12 including a reflective layer 14 and an absorptive layer 15; a heat-dissipation layer 16 located over the array of wires 12; and the absorptive layer 15 sandwiched between the reflective layer 14 and the heat-dissipation layer 16, in accordance with an embodiment of the present invention.

Figure 2:
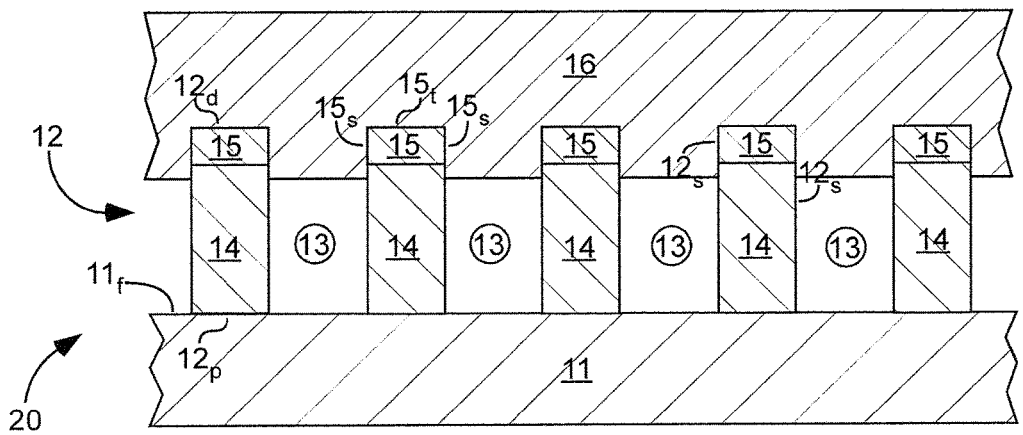

FIG. 2 is a schematic, cross-sectional side-view of WGP 20, similar to WGP 10, but with the heat-dissipation layer 16 extending into the channels 13 and along sides of the absorptive layer 15 to directly contact the reflective layer 14, in accordance with an embodiment of the present invention.

Figure 3:
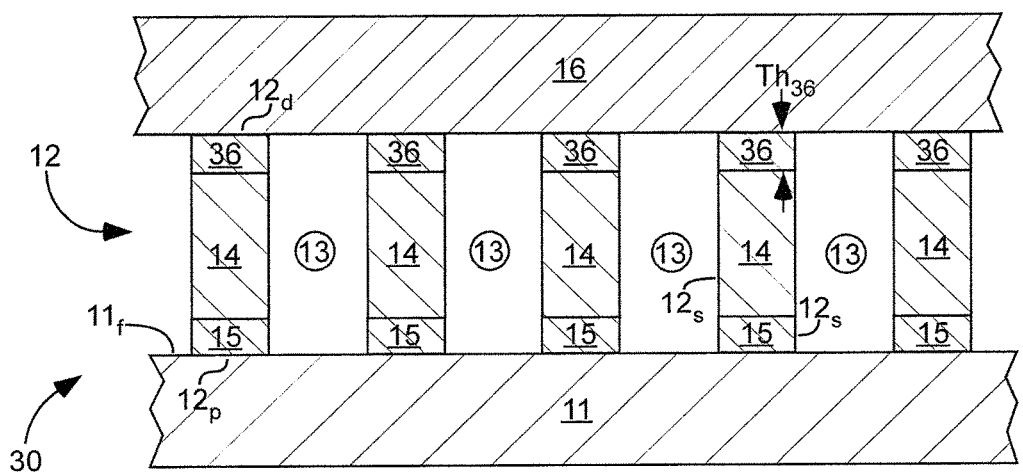

FIG. 3 is a schematic, cross-sectional side-view of WGP 30, similar to WGP 10, but with the reflective layer 14 sandwiched between the absorptive layer 15 and the heat-dissipation layer 16, in accordance with an embodiment of the present invention.

Figure 4:
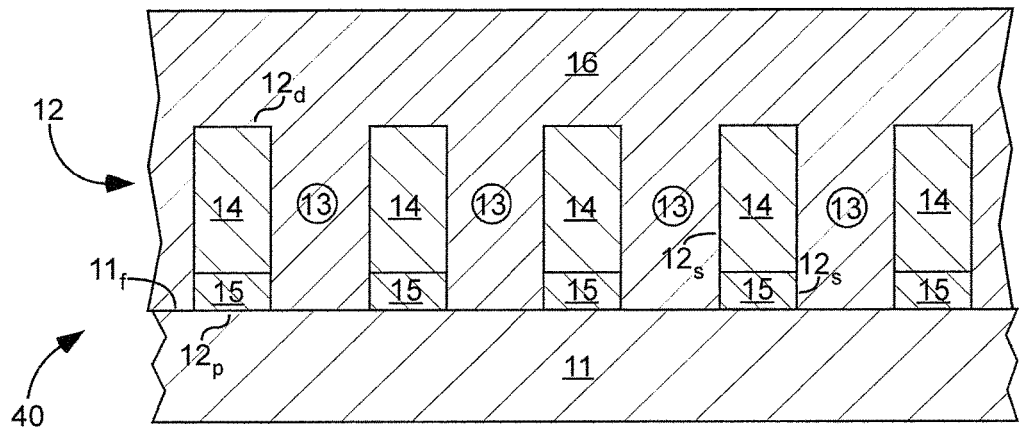

FIG. 4 is a schematic, cross-sectional side-view of WGP 40, similar to WGPs 10, 20, and 30, but with the heat-dissipation layer 16 extending into and filling the channels 13, in accordance with an embodiment of the present invention.

Figure 5:
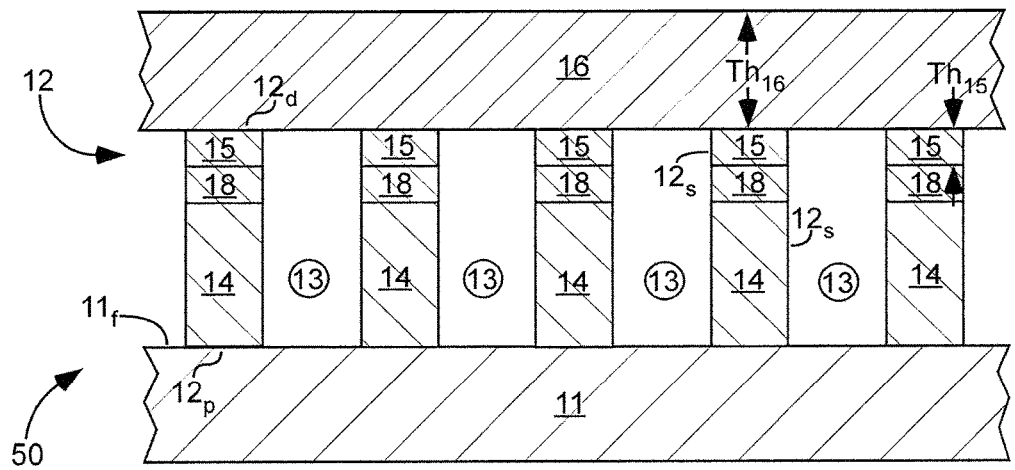

FIG. 5 is a schematic, cross-sectional side-view of WGP 50, similar to WGP 10, except that each of the wires 12 further comprises a thermal-insulating layer 18 sandwiched between the reflective layer 14 and the absorptive layer 15, in accordance with an embodiment of the present invention.

Figure 6:
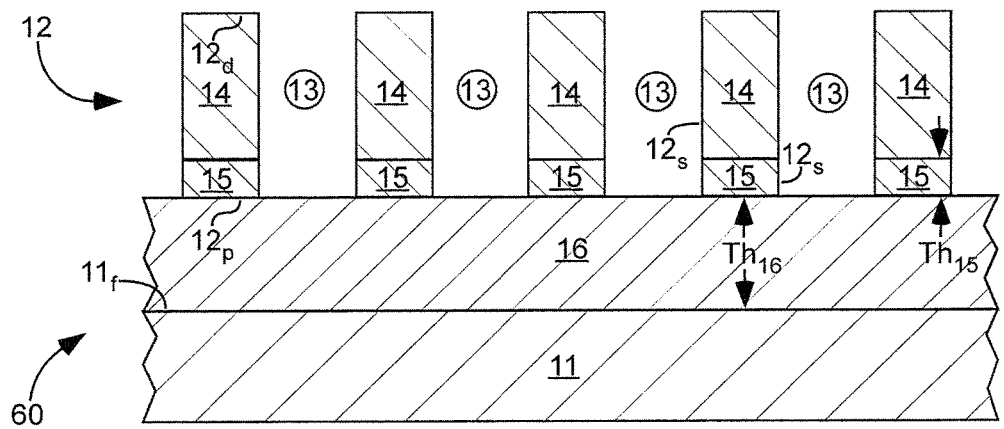

FIG. 6 is a schematic, cross-sectional side-view of WGP 60, similar to WGP 10, except that the heat-dissipation layer 16 is sandwiched between the array of wires 12 and the transparent substrate 11, with the absorptive layer 15 sandwiched between the reflective layer 14 and the heat-dissipation layer 16, in accordance with an embodiment of the present invention.

Figure 7:
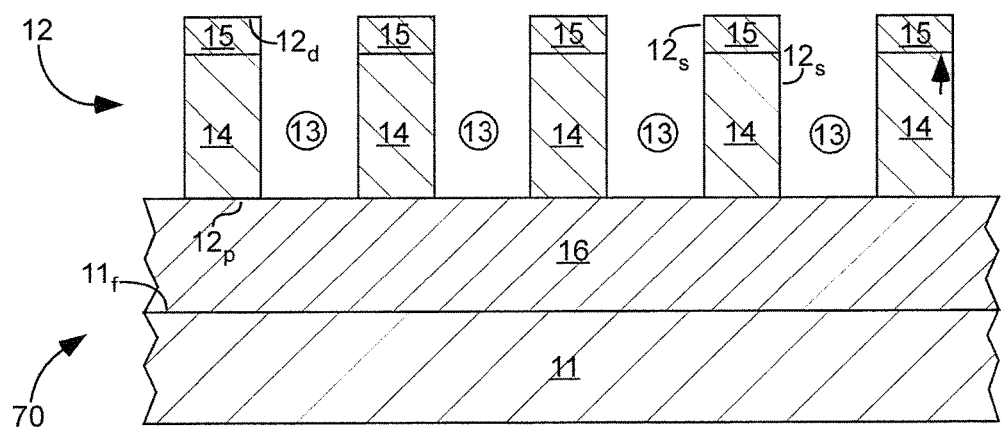

FIG. 7 is a schematic, cross-sectional side-view of WGP 70, similar to WGP 60, but with the reflective layer 14 sandwiched between the absorptive layer 15 and the heat-dissipation layer 16, in accordance with an embodiment of the present invention.

Figure 8:
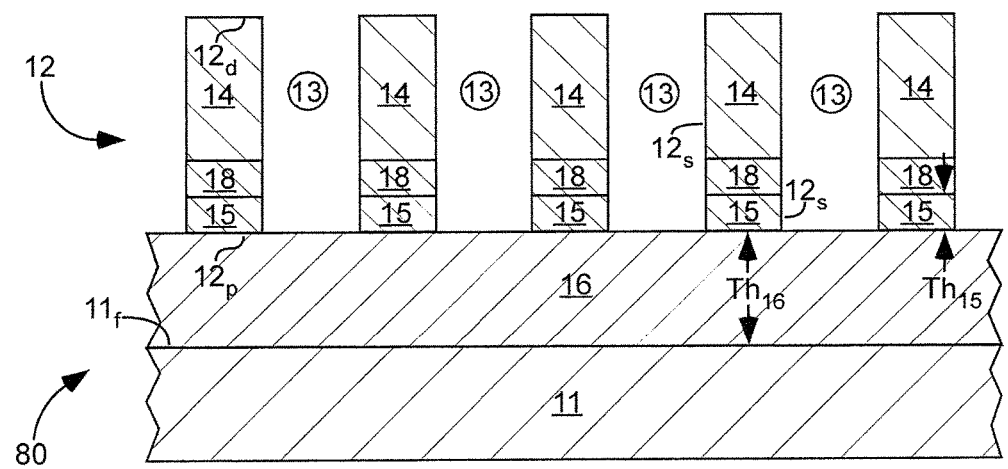

FIG. 8 is a schematic, cross-sectional side-view of WGP 80, similar to WGP 60, except that each of the wires 12 further comprises a thermal-insulating layer 18 sandwiched between the reflective layer 14 and the absorptive layer 15, in accordance with an embodiment of the present invention.

Figure 9:
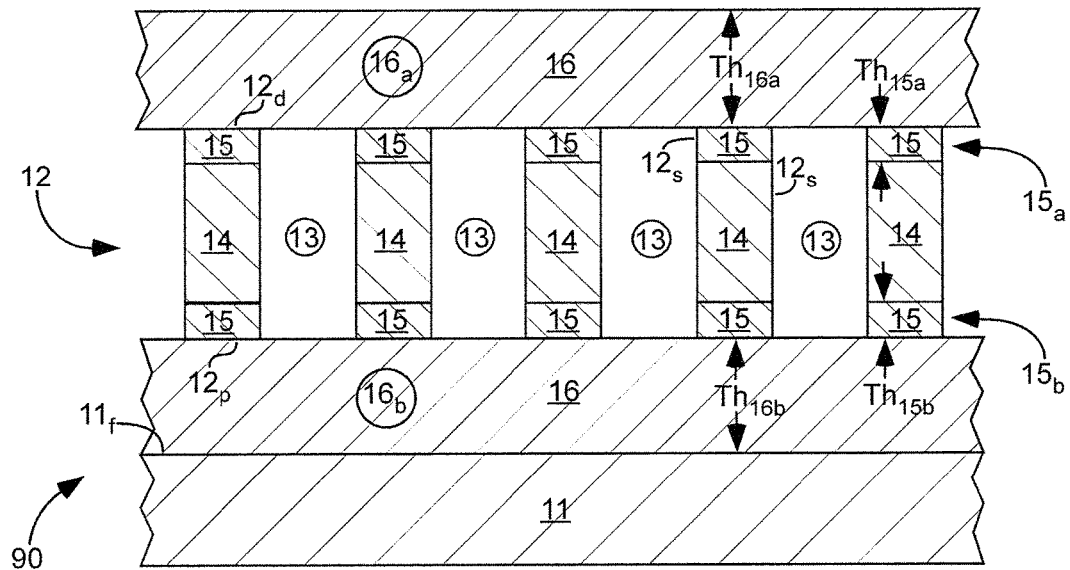

FIG. 9 is a schematic, cross-sectional side-view of WGP 90, similar to WGP 10, but further comprising a second absorptive layer 15$_b$ and a second heat-dissipation layer 16$_b$, in accordance with an embodiment of the present invention.

Figure 10:
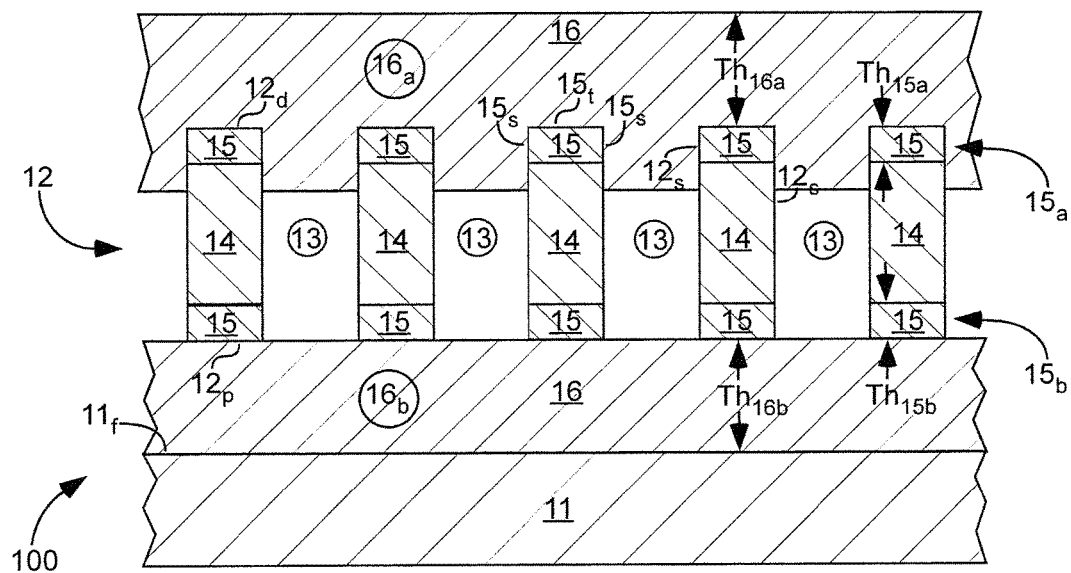

FIG. 10 is a schematic, cross-sectional side-view of WGP 100, similar to WGP 90, but with the heat-dissipation layer 16 extending into the channels 13 and along sides 15$_s$ of the absorptive layer 15 to directly contact the reflective layer 14, in accordance with an embodiment of the present invention.

Figure 11:
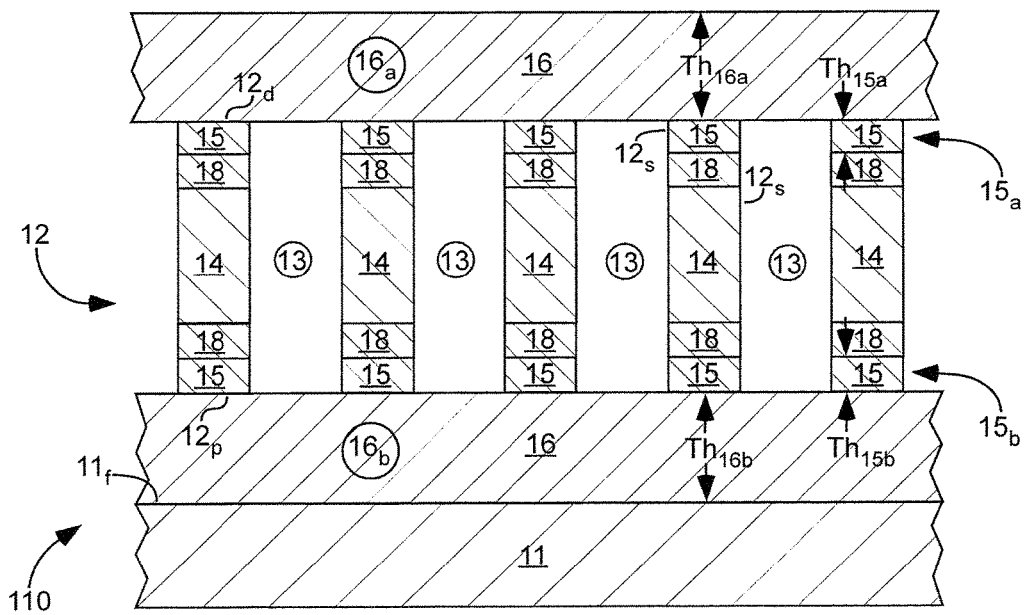

FIG. 11 is a schematic, cross-sectional side-view of WGP 110, similar to WGP 90, except that each of the wires 12 further comprises thermal-insulating layers 18 sandwiched between the reflective layer 14 and each adjacent absorptive layer 15, in accordance with an embodiment of the present invention.

Figure 12:
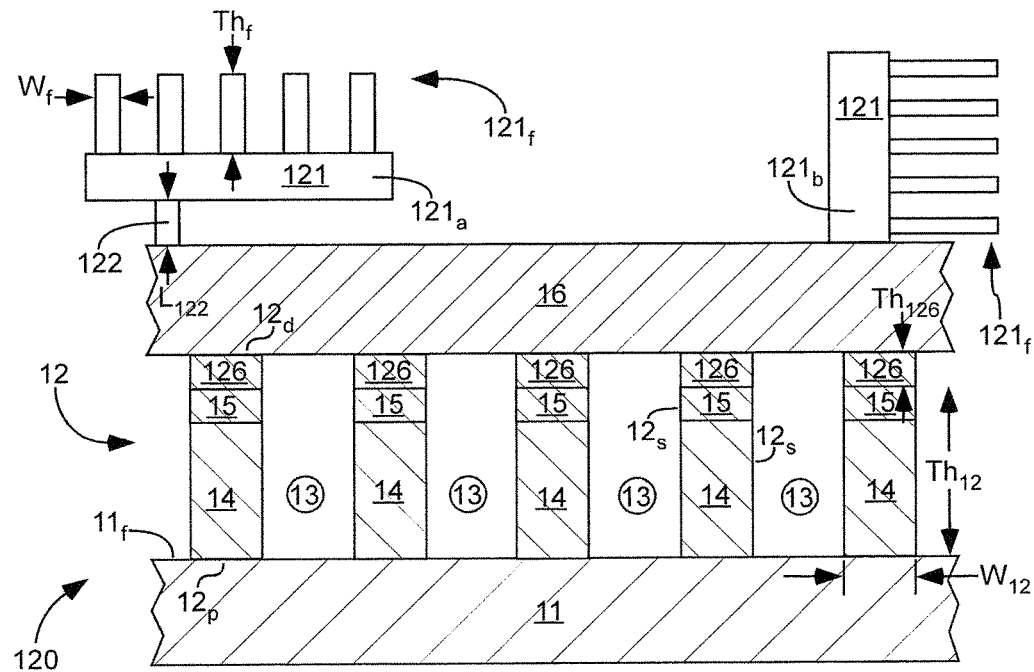

FIG. 12 is a schematic, cross-sectional side-view of WGP 120, similar to other WGPs described herein, but further comprising heat sinks 121, in accordance with an embodiment of the present invention.

Figure 13:
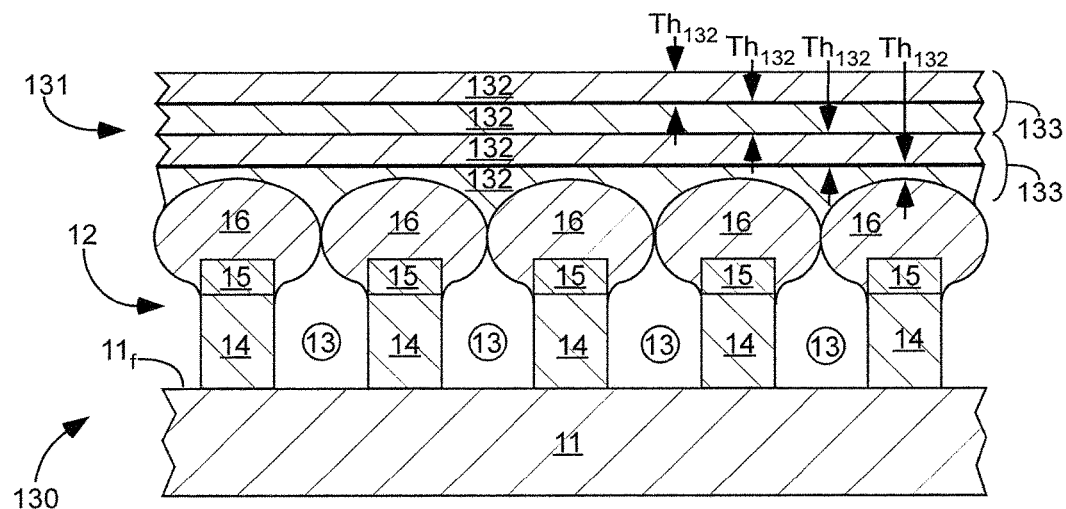

FIG. 13 is a schematic, cross-sectional side-view of WGP 130, similar to other WGPs described herein, but further comprising an antireflection layer 131 including multiple thin-film layers 132 located on the heat-dissipation layer 16, in accordance with an embodiment of the present invention.

Figure 14:
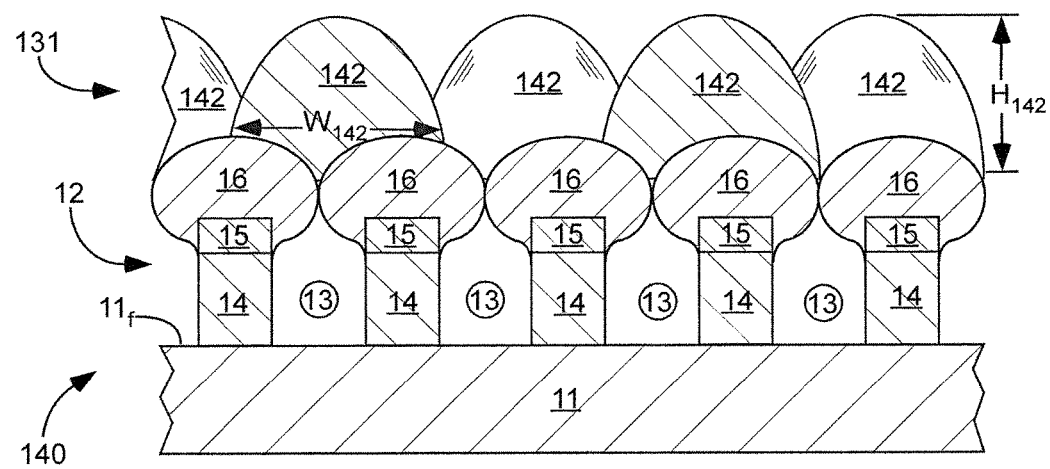

FIG. 14 is a schematic, cross-sectional side-view of WGP 140, similar to other WGPs described herein, but further comprising an antireflection layer 131 including multiple protrusions 142 located on the heat-dissipation layer 16, in accordance with an embodiment of the present invention.

Figure 15:
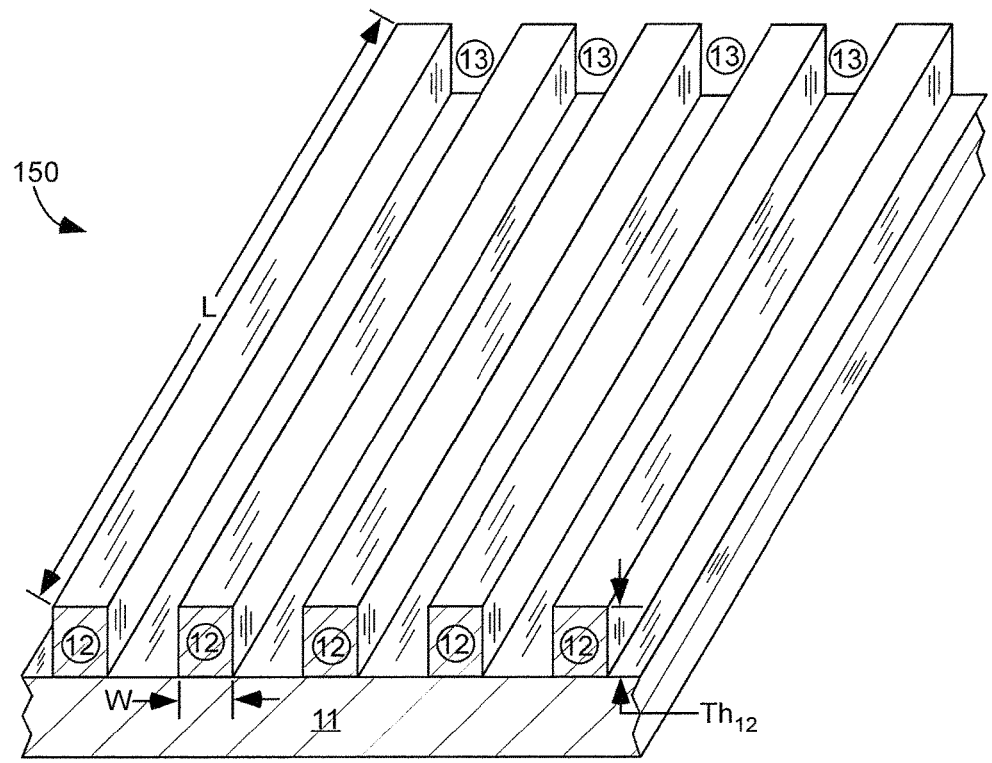

FIG. 15 is a schematic, perspective view of WGP 150, similar to other WGPs described herein, but without the heat-dissipation layer 16 in order to clearly show the structure of the array of wires 12, in accordance with an embodiment of the present invention.

Figure 16:
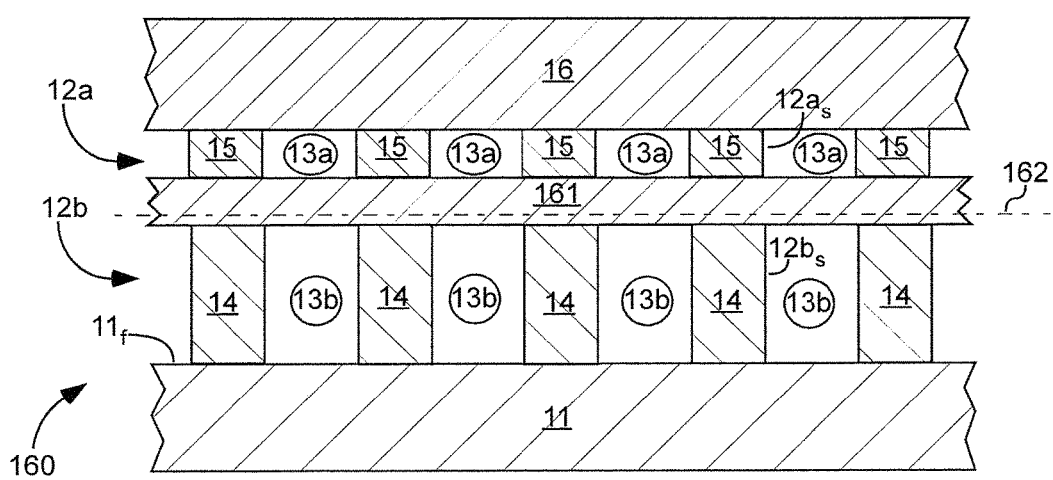

FIG. 16 is a schematic, cross-sectional side-view of WGP 160, with a continuous thin film layer 161 sandwiched between the reflective layer 14 and the absorptive layer 15, forming two separate and distinct arrays of wires 12a and 12b.

DEFINITIONS

As used herein, the terms "on", "located on", "located at", and "located over" mean located directly on or located over with some other material between. The terms "located directly on", "adjoin", "adjoins", and "adjoining" mean direct and immediate contact with no other solid material between.

As used herein "continuous" means a layer which may include some discontinuity, such as pinholes, but no major discontinuity, such as a division into a grid or separate wires.

As used herein, the term "elongated" means that a length L of the wires 12 (length extending into the page of FIGS. 1-14 & 16 and also shown in the perspective view of FIG. 15), is substantially greater than wire width $W_{12}$ or wire thickness $Th_{12}$ (e.g. L can be at least 10 times, at least 100 times, at least 1000 times, or at least 10,000 times larger than wire width $W_{12}$ and/or wire thickness $Th_{12}$).

As used herein, the terms "fill", "fills", and "filling", as in "fills the channels" mean completely fills, fills within normal manufacturing tolerances, or nearly completely fills, such that any deviation from completely fills would have negligible effect for ordinary use of the device.

As used herein, the term "parallel" means exactly parallel, parallel within normal manufacturing tolerances, or nearly parallel, such that any deviation from exactly parallel would have negligible effect for ordinary use of the device.

As used herein, the term "thermal contact" means that the devices in thermal contact with each other are (a) directly touching; or (b) not directly touching but all material(s) between the devices have a coefficient of thermal conductivity of at least 2.0 W/(m*K).

As used herein, the term "optical thin film" means a thin layer having a thickness less than 10 µm, less than 1 µm, less than 0.5 µm, or less than 0.3 µm, depending on the light spectrum of interest.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Such materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with $k \leq 0.1$ in the specified wavelength range are "transparent" materials, materials with $k > 0.1$ and $R \leq 0.6$ in the specified wavelength range are "absorptive" materials, and materials with $k > 0.1$ and $R > 0.6$ in the specified wavelength range are "reflective" materials.

DETAILED DESCRIPTION

As illustrated in FIGS. 1-14, wire grid polarizers (WGPs for plural or WGP for singular) 10, 20, 30, 40, 50, 60, 70, 80, 90, 100, 110, 120, 130, and 140, each configured to polarize light incident thereon, are shown comprising an array of wires 12 over a face 11$_f$ of a transparent substrate 11, with channels 13 between adjacent wires 12. Each of the wires 12 can include a reflective layer 14 and an absorptive layer 15. The array of wires 12 can be elongated and parallel.

For each wire 12, the reflective layer 14 and the absorptive layer 15 can be aligned with a plane 17 that is perpendicular to the face 11$_f$ of the transparent substrate 11 and parallel to the length L of the wires 12. Thus, each plane 17 can pass through both the reflective layer 14 and the absorptive layer 15 for the respective wire 12. Sides 12$_s$ of each wire 12 can be parallel to the plane 17.

As shown in FIGS. 1-14 & 16, the WGPs can further comprise heat-dissipation layer(s) 16. The heat-dissipation layer 16 can be an optical thin film and can be a continuous layer. The heat-dissipation layer 16 can draw heat away from the array of wires 12, and can conduct this heat to an external heat sink 121 as described below, or can transfer this heat away from the WGP by convection or radiation. For example, the absorptive layer 15 can generate heat from absorbed light and the heat-dissipation layer 16 can conduct this heat away from the reflective layer 14.

As shown in FIGS. 1-5 & 13-14, the heat-dissipation layer 16 can be located over the array of wires 12 and farther from the transparent substrate 11 than the array of wires 12. As shown in FIGS. 6-8, the heat-dissipation layer 16 can be located or sandwiched between the array of wires 12 and the transparent substrate 11.

As shown on WGPs 90 and 100 in FIGS. 9-10, each wire 12 can include a first absorptive layer 15$_a$ and a second absorptive layer 15$_b$ with the reflective layer 14 sandwiched between. WGPs 90 and 100 include two heat-dissipation layers 16, including a first heat-dissipation layer 16$_a$ located over the array of wires 12 and farther from transparent substrate 11 and a second heat-dissipation layer 16$_b$ located under the array of wires 12 and closer to transparent substrate 11. The array of wires 12 can be sandwiched between the first heat-dissipation layer 16$_a$ and the second heat-dissipation layer 16$_b$ with the first absorptive layer 15$_a$ located closer to the first heat-dissipation layer 16$_a$ and the second absorptive layer 15$_b$ located closer to the second heat-dissipation layer 16$_b$.

A decision of where to locate the heat-dissipation layer 16 and the number of heat-dissipation layers 16 can be made based on direction of incident light, amount of heat that must be dissipated, manufacturability, and performance requirements of the WGP.

The heat-dissipation layer 16 can have high electrical resistivity in order to electrically isolate each wire 12 from adjacent wires 12. For example, the heat-dissipation layer 16 can have an electrical resistivity of $>10^4$ Ω*cm, $>10^5$ Ω*cm, $>10^6$ Ω*cm, $>10^7$ Ω*cm, $>10^8$ Ω*cm, $>10^9$ Ω*cm, or $>10^{10}$ Ω*cm. All electrical resistivity values specified herein are measured at 20° C.

The heat-dissipation layer 16 can have a high coefficient of thermal conductivity k to effectively conduct heat away from the array of wires 12. For example, the heat-dissipation layer 16 can have a coefficient of thermal conductivity k of >5 W/(m*K), >10 W/(m*K), >15 W/(m*K), >20 W/(m*K), or >25 W/(m*K). All coefficient of thermal conductivity k values specified herein are measured at 25° C.

One example of a material that meets the above requirements of a heat-dissipation layer 16 is aluminum oxide. For example, the heat-dissipation layer 16 can comprise ≥50%, ≥75%, ≥90%, ≥95%, or ≥99% aluminum oxide. Due to imperfections in deposition of material, aluminum oxide can be deposited in nonstoichiometric ratios. Therefore, the term aluminum oxide ($Al_2O_3$) used herein means approximately two aluminum atoms for every three oxygen atoms, such as for example $Al_xO_y$, where $1.9 \leq x \leq 2.1$ and $2.9 \leq y \leq 3.1$.

The array of wires 12 and the heat-dissipation layer 16 can be made of or can include materials for polarization of light, including metals and/or dielectrics, as are typically used in wires of wire grid polarizers. See for example U.S. Pat. Nos. 7,961,393 and 8,755,113, which are incorporated herein by reference.

As shown in FIGS. 1, 3, 5, 9, and 11-12, the heat-dissipation layer 16 can span the channels 13 and not extend into the channels 13, or extend only minimally into the channels 13. The channels 13 can be air filled.

As shown in FIGS. 2, 10, and 13-14, the heat-dissipation layer 16 can extend partially into the channels 13 and the channels 13 can be partially air filled. The channels 13 can be mostly filled with the heat-dissipation layer 16 or mostly air filled. Having the channels 13 partially filled with the heat dissipation layer 16 can be particularly beneficial if the absorptive layer 15 is sandwiched between the reflective layer 14 and the heat-dissipation layer 16 and the heat-dissipation layer 16 extends into the channels 13 and along sides of the absorptive layer 15 to directly contact the reflective layer 14. WGPs 130 and 140 in FIGS. 13-14 with a match head shaped heat-dissipation layer 16 on each wire 12, grown together to form a continuous thin film, is a typical shape. This shape is beneficial for (a) a large area of contact between the absorptive layer 15 and the heat-dissipation layer 16 and (b) for increasing the area for convective and radiation heat transfer away from the heat-dissipation layer 16 (due to the wavy or curved shape on the outer surface). Manufacture of this shaped layer described in patent publication U.S. 2012/0075699, which is incorporated herein by reference. As shown in FIG. 4, the heat-dissipation layer can 16 extend into and can fill the channels 13.

WGP 160 of FIG. 16 includes a continuous layer 161, in a plane 162 parallel to the face $11_f$ of the transparent substrate 11, sandwiched between the reflective layer 14 and the absorptive layer 15. Therefore, instead of having a single array of wires 12, as shown in FIGS. 1-14, this continuous layer 161 creates two, separate arrays of wires 12a and 12b. A sidewall $12a_s$ of the upper array of wires 12a is interrupted from a sidewall $12b_s$ of the lower array of wires 12b by this continuous layer 161. This continuous layer 161 can interfere with proper performance of the WGP and can create manufacturing difficulties. Furthermore, channels 13a between the upper array of wires 12a are separate from channels 13b of the lower array of wires 12b, and thus a single channel does not extend across both the reflective layer 14 and the absorptive layer 15.

In contrast, sidewalls $12_s$ of each of the wires 12 of the WGPs in FIGS. 1-14 extend from the reflective layer 14 to the absorptive layer 15 uninterrupted by any continuous layer in a plane 162 parallel to the face of the transparent substrate 17. Thus, each reflective layer 14 is paired with an absorptive layer 15 in each wire 12. Also, each of the channels 13 can extend from a proximal end $12_p$ of the array of wires 12 closest to transparent substrate 11 to a distal end $12_d$ of the array of wires 12 farthest from transparent substrate 11.

In FIGS. 1-2, 5-6, and 8-14, the absorptive layer 15 is sandwiched between the reflective layer 14 and the heat-dissipation layer 16. In FIGS. 3-4 and 7, the reflective layer 14 is sandwiched between the absorptive layer 15 and the heat-dissipation layer 16. In FIGS. 3-4, 6, and 8, the absorptive layer 15 is located closer to the transparent substrate 11 than the reflective layer 14. A choice between these designs can be made based on manufacturability, performance requirements of the application, and amount of light that needs to be dissipated.

In order to allow sufficient removal of heat to the heat-dissipation layer 16, it can be beneficial to have minimal resistance to heat transfer between the absorptive layer 15 and the heat-dissipation layer 16. Therefore, the absorptive layer 15 can adjoin the heat-dissipation layer 16 as shown in FIGS. 1-2, 4-6, 8-11, and 13-14. Alternatively, the absorptive layer 15 can be separated from the heat-dissipation layer 16 by material (e.g. layer 126 in FIG. 12) having a small thermal resistance for heat conduction of a unit area ($R_A$), such as for example <$10^{-6}$ K*m²/W, <$10^{-7}$ K*m²/W, <$10^{-8}$ K*m²/W, <$10^{-9}$ K*m²/W, <$10^{-10}$ K*m²/W. The term thermal resistance for heat conduction of a unit area ($R_A$) means a thickness (e.g. $Th_{126}$) of the material 126 divided by a coefficient of thermal conductivity (k). Thus, $R_A=Th/k$; so for a 100 nm thick layer of Al, $R_A=100$ nm/[205 W/(m*K)] $=5 \times 10^{-10}$ K*m²W; and for a 10 nm thick layer of $SiO_2$, $R_A=10$ nm/[0.96 W/(m*K)]=$10^{-8}$ K*m²/W.

Alternatively or in addition, in order to allow sufficient removal of heat to the heat-dissipation layer 16, it can be beneficial to have minimal resistance to heat transfer between the reflective layer 14 and the heat-dissipation layer 16. Therefore, the reflective layer 14 can adjoin the heat-dissipation layer 16 as shown in FIGS. 2, 4, 7, 10, and 13-14. Alternatively, the reflective layer 14 can be separated from the heat-dissipation layer 16 by material (e.g. layer 36 in FIG. 3) having a small thermal resistance for heat conduction of a unit area ($R_A$), such as for example <$10^{-6}$ K*m²W, <$10^{-7}$ K*m²/W, <$10^{-8}$ K*m²/W, <$10^{-9}$ K*m²/W, <$10^{-10}$ K*m²W.

Sometimes light is incident on the WGP in pulses and merely having a heat sink to store, then gradually dissipate, absorbed heat can be sufficient. The heat-dissipation layer 16 can be a heat sink for heat absorbed by the absorptive layer 15. Increased volume of the heat-dissipation layer 16 can be beneficial to allow sufficient volume for absorption of this heat. Thus, for example, a volume of the heat-dissipation layer 16 can be at least two times greater, at least three times greater, at least five times greater, at least eight times greater, at least twelve times greater, or at least eighteen times greater than a volume of the absorptive layer 15.

Another way to describe the added size of the heat-dissipation layer 16 is by its thickness $Th_{16}$ compared to a thickness $Th_{15}$ of the absorptive layer 15. The thickness $Th_{16}$ of the heat-dissipation layer 16 is a straight-line distance from a distal end $12_d$ of the array of wires 12 farthest from transparent substrate 11, to an outermost surface of the heat-dissipation layer 16. The thickness $Th_{15}$ of the absorptive layer 15 and the thickness $Th_{16}$ of the heat-dissipation layer 16 are both measured perpendicular to the face $11_f$ of a transparent substrate 11. Following are example relationships of these comparative thicknesses: $Th_{16} \geq 2*Th_{15}$, $Th_{16} \geq 3*Th_{15}$, $Th_{16} \geq 5*Th_{15}$, or $Th_{16} \geq 10*Th_{15}$. Following are example thicknesses of the absorptive layer 15 and the heat-dissipation layer 16: $Th_{15} \geq 5$ nm or $Th_{15} \geq 20$ nm; $Th_{15} \leq 200$ nm or $Th_{15} \leq 100$ nm; $Th_{16} \geq 50$ nm, $Th_{16} \geq 100$ nm, $Th_{16} \geq 200$ nm, or $Th_{16} \geq 400$ nm; and $Th_{16} \leq 2000$ nm, $Th_{16} \leq 1000$ nm, or $Th_{16} \leq 500$ nm.

For some applications, convective and/or radiative heat transfer away from the heat-dissipation layer 16 can keep the WGP at a sufficiently low temperature. For other applications, based on increased heat input and/or materials in the WGP with a lower melting temperature, conductive heat transfer to a heat sink might be needed. As shown in FIG. 12, a heat sink 121 can be coupled to the heat-dissipation layer 16 and can conduct heat away from the heat-dissipation layer 16, and thus away from the array of wires 12. The heat sink 121 can be located outside of the array of wires 12.

The heat sink 121 can comprise multiple fins $121_f$, such as for example at least five fins $121_f$ as shown in FIG. 12. Each of the fins $121_f$ can have a width $W_f$ and a thickness $Th_f$ much larger than the width $W_{12}$ and thickness $Th_{12}$ of the wires 12 and large enough to transfer heat from the WGP 120 to the surrounding air. For example, each of the fins $121_f$ can have a width $W_f$ of $\geq 0.01$ mm, $\geq 0.1$ mm, $\geq 1$ mm, or $\geq 100*W_{12}$; and a thickness $Th_f$ of $\geq 0.1$ mm, $\geq 2$ mm, $\geq 6$ mm, or $\geq 100*Th_{12}$. The heat sink 121, including the fins $121_f$, can have a high coefficient of thermal conductivity k, such as for example >10 W/(m*K), >40 W/(m*K), or >60 W/(m*K), where W=watt, m=meter, and K=degrees Kelvin.

In order to allow sufficient transfer of heat from the heat-dissipation layer 16 to the heat sink 121, the heat sink 121 can adjoin the heat-dissipation layer 16 (see heat sink $121_b$ in FIG. 12). Alternatively, as shown on heat sink $121_a$ in FIG. 12, sufficient heat can transfer to the heat sink 121 if the heat sink 121 is separated from the heat-dissipation layer 16 by material 122 with a small thermal resistance for heat conduction (R). For example R<1 K/W, R<10 K/W, R<50 K/W, R<100 K/W, where W=watt, K=degrees Kelvin, $R = L_{122}/(k*A_{122})$, $L_{122}$ is the length of the material 122 between the heat-dissipation layer 16 and the heat sink 121, $A_{122}$ is the area of the material for heat transfer (extending into the page of FIG. 12), and k is the coefficient of thermal conductivity.

Addition of the heat-dissipation layer 16 can result in a drop in WGP performance. This drop in WGP performance can be avoided or mitigated by addition of an antireflection layer 131, located over the heat-dissipation layer 16, farther from the substrate 11 than the heat-dissipation layer 16, the heat-dissipation layer 16 being sandwiched between the antireflection layer and the array of wires 12, as shown on WGPs 130 and 140 in FIGS. 13-14. The heat-dissipation layer 16 can provide a base or foundation for applying the antireflection layer 131.

As shown on WGP 130 in FIG. 13, the antireflection layer 131 can include multiple thin-film layers 132 on the heat-dissipation layer 16. These thin-film layers 132 can extend continuously across the heat-dissipation layer 16 and can reduce reflection of incident light on the heat-dissipation layer 16. One example of a thin-film antireflection layer 131 is at least two pairs 133 of thin-film layers 132 with each pair 133 including a thin-film layer 132 of silicon dioxide and a thin-film layer 132 of 95% $ZrO_2$ plus 5% $TiO_2$. Examples of a thickness $Th_{132}$ of each layer is between 30 and 300 nanometers.

As shown on WGP 140 in FIG. 14, the antireflection layer 131 can include multiple protrusions 142, formed in an array, located on the heat-dissipation layer 16. The protrusions 141 can be designed for reducing reflection of incident light on the heat-dissipation layer 16. For example, each protrusion 141 can have a width $W_{142}$ and a height $H_{142}$ that are <300 nm, <700 nm, or <1200 nm.

As shown in FIGS. 1-4, 6-7, 9-10, and 12-14, the reflective layer 14 can adjoin the absorptive layer 15. Alternatively, as shown in FIGS. 5 and 8, each of the wires 12 can further comprise a thermal-insulating layer 18 sandwiched between the reflective layer 14 and the absorptive layer 15. As shown in FIG. 11, each of the wires 12 can further comprise two thermal-insulating layers 18, with one sandwiched between the reflective layer 14 and the first absorptive layer $15_a$ and the other sandwiched between the reflective layer 14 and the second absorptive layer $15_b$. The thermal-insulating layer 18 can minimize heat transfer from the absorptive layer 15 to the reflective layer 14, thus minimizing the chance of melting the reflective layer 14. The thermal-insulating layer 18 can have a low coefficient of thermal conductivity, such as for example <8 W/(m*K), <4 W/(m*K), <2 W/(m*K), or <1.5 W/(m*K).

In order to improve heat transfer from the absorptive layer 15 to the heat-dissipation layer 16, there can be a large contact area between the two materials. For example, the heat-dissipation layer 16 can cover $\geq 50\%$, $\geq 80\%$, $\geq 90\%$, or $\geq 95\%$ of an exposed surface of the absorptive layer 15, the exposed surface of the absorptive layer 15 being any surface of the absorptive layer 15 not in direct contact with the transparent substrate 11 or material of the array of wires 12 (e.g. the reflective layer 14 or the thermal-insulating layer 18).

What is claimed is:
1. A wire grid polarizer (WGP) configured to polarize light incident thereon, the WGP comprising:
an array of wires over a face of a transparent substrate, with channels between adjacent wires;
each of the wires including a reflective layer sandwiched between a first absorptive layer and a second absorptive layer, the first absorptive layer physically separate from the second absorptive layer;
the reflective layer having k>0.1 and R>0.6 and the absorptive layers having k>0.1 and R≤0.6 across visible spectrum, where reflectance (R) is calculated by

$$R = \frac{(n-1)^2 + k^2}{(n+1)^2 + k^2},$$

n is a real part of a refractive index, and k is an extinction coefficient;
sidewalls of each of the wires extending from the reflective layer to the absorptive layer uninterrupted by an continuous layer in a plane parallel to the face of the transparent substrate;
a first heat-dissipation layer located over the array of wires farther from transparent substrate, the first heat-dissipation layer being a continuous layer having an electrical resistivity of greater than $10^6$ Ω*cm and a coefficient of thermal conductivity of greater than 5 W/(m*K);
a second heat-dissipation layer located under the array of wires and closer to transparent substrate, the second heat-dissipation layer being a continuous layer extending continuously across the substrate and separating the substrate from the array of wires, and the second heat-dissipation layer having an electrical resistivity of greater than $10^6$ Ω*cm and a coefficient of thermal conductivity of greater than 5 W/(m*K); and the wires and the channels separating the first heat-dissipation layer from the second heat-dissipation layer.

2. The WGP of claim 1, wherein the absorptive layer is sandwiched between the reflective layer and the transparent substrate, the absorptive layer separating the reflective layer from the transparent substrate, and the heat-dissipation layer adjoins the reflective layer.

3. The WGP of claim 1, further comprising an antireflection layer located over the heat-dissipation layer and farther from the transparent substrate than the heat-dissipation layer, the heat-dissipation layer being sandwiched between the antireflection layer and the array of wires, and the heat-dissipation layer separating the antireflection layer from the array of wires and the heat-dissipation layer adjoining the antireflection layer and the array of wires.

4. The WGP of claim 1, wherein a volume of the heat-dissipation layer is at least twelve times greater than a volume of the absorptive layer.

5. The WGP of claim 1, wherein a thickness of the heat-dissipation layer, from a distal end of the array of wires farthest from the transparent substrate, to an outermost surface of the heat-dissipation layer, is at least ten times greater than a thickness of the absorptive layer, both thicknesses being measured perpendicular to the face of the transparent substrate.

6. A wire grid polarizer (WGP) configured to polarize light incident thereon, the WGP comprising:
an array of wires over a face of a transparent substrate, with channels between adjacent wires;
each of the wires including a reflective layer and an absorptive layer;
the reflective layer having k>0.1 and R>0.6 and the absorptive layer having k>0.1 and R≤0.6 across visible spectrum, where reflectance (R) is calculated by $$R = \frac{(n-1)^2 + k^2}{(n+1)^2 + k^2},$$

n is a real part of a refractive index, and k is an extinction coefficient;
sidewalls of each of the wires extending from the reflective layer to the absorptive layer uninterrupted by any continuous layer in a plane parallel to the face of the transparent substrate;
a heat-dissipation layer located over the array of wires and farther from the transparent substrate than the array of wires or located between the array of wires and the transparent substrate;
the heat-dissipation layer being a continuous layer having an electrical resistivity of greater than $10^6$ Ω*cm and a coefficient of thermal conductivity of greater than 5 W/(m*K);
the absorptive layer is located closer to the heat-dissipation layer than the reflective layer;
each of the wires further comprises a thermal-insulating layer sandwiched between the reflective layer and the absorptive layer, the thermal-insulating layer having a coefficient of thermal conductivity of less than 4 W/(m*K).

7. The WGP of claim 6, wherein:
the absorptive layer is capable of generating heat from absorbed light; and
the heat-dissipation layer is capable of conducting the heat generated in the absorptive layer away from the reflective layer.

8. The WGP of claim 6, wherein each of the channels extends from a proximal end of the array of wires closest to transparent substrate to a distal end of the array of wires farthest from transparent substrate.

9. The WGP of claim 6, wherein:
the absorptive layer is a first absorptive layer;
each of the wires further comprises a second absorptive layer;
the reflective layer is sandwiched between the first absorptive layer and the second absorptive layer, the first absorptive layer separated from the second absorptive layer by the reflective layer;
the heat-dissipation layer is a first heat-dissipation layer located over the array of wires and farther from transparent substrate;
the WGP further comprises a second heat-dissipation layer located under the array of wires and closer to transparent substrate, the second heat-dissipation layer being a continuous layer having an electrical resistivity of greater than $10^6$ Ω*cm and a coefficient of thermal conductivity of greater than 5 W/(m*K); and
the array of wires is sandwiched between the first heat-dissipation layer and the second heat-dissipation layer with the first absorptive layer located closer to the first heat-dissipation layer and the second absorptive layer located closer to the second heat-dissipation layer, the wires and the channels separating the first heat-dissipation layer from the second heat-dissipation layer.

10. The WGP of claim 6, wherein the heat-dissipation layer comprises at least 90% aluminum oxide.

11. The WGP of claim 6, wherein the coefficient of thermal conductivity of the heat-dissipation layer is greater than 15 W/(m*K).

12. The WGP of claim 6, wherein the heat-dissipation layer adjoins the reflective layer.

13. The WGP of claim 6, wherein the heat-dissipation layer adjoins the absorptive layer.

14. The WGP of claim 6, wherein the heat-dissipation layer adjoins at least 90% of an exposed surface of the absorptive layer, the exposed surface of the absorptive layer being any ail surfaces of the absorptive layer not in direct contact with the transparent substrate or material of the array of wires.

15. The WGP of claim 6, wherein the absorptive layer is sandwiched between the reflective layer and the heat-dissipation layer, the absorptive laser separating the reflective layer from the heat-dissipation layer, and the heat-dissipation layer extends into the channels and along sides of the absorptive layer to directly contact the reflective layer.

16. The WGP of claim 6, further comprising:
a heat sink coupled to the heat-dissipation layer capable of conducting heat away from the heat-dissipation layer, and thus away from the array of wires; and
the heat sink being located outside of the array of wires and comprising at least five fins; and
the heat sink having a coefficient of thermal conductivity of >40 W/(m*K).

17. The WGP of claim 16, wherein $W_f \leq 100 * W_{12}$ and $Th_f \times 100 * Th_{12}$, where $W_f$ is a width of the fins, $W_{12}$ is a width of the wires, $Th_f$ is a thickness of the fins, $Th_{12}$ is a thickness of the wires.

* * * * *